June 24, 1924.

A. B. SEVERN 1,499,125

ROLLER SIDE BEARING

Filed Oct. 2, 1922

WITNESSES
A. B. Wallace.
C. R. Halbert.

INVENTOR
Arthur B. Severn
BY
Winter & Brown
ATTORNEYS

Patented June 24, 1924.

1,499,125

UNITED STATES PATENT OFFICE.

ARTHUR B. SEVERN, OF PITTSBURGH, PENNSYLVANIA, ASSIGNOR TO A. STUCKI, OF PITTSBURGH, PENNSYLVANIA.

ROLLER SIDE BEARING.

Application filed October 2, 1922. Serial No. 591,722.

*To all whom it may concern:*

Be it known that I, ARTHUR B. SEVERN, a citizen of the United States, and a resident of Pittsburgh, in the county of Allegheny and State of Pennsylvania, have invented a new and useful Improvement in Roller Side Bearings, of which the following is a specification.

This invention relates to anti-friction side bearings for railway cars and has for its objects the provision of a bearing of this type in which the roller is self-centering, in which the liability of the roller developing flat spots or recesses on its circumference, or the track upon which the roller runs becoming rough or recessed, thus interfering with the free travel of the rolling element, is prevented, and in which the roller gravitates to the center of its track under its own weight immediately after contact between the upper bearing plate and the roller is broken, that is, as soon as the body of the car lifts sufficiently to break contact with the roller.

A special object is to provide a side bearing which obviates the necessity of using any special devices for moving the roller, either into operative or inoperative positions.

Another special object is to provide a side bearing having a free roller which will be positively retained in operative relation with the lower bearing surface and will not be displaced or lost regardless of the degree of vertical clearance between the roller and upper bearing plate and at the same time will be hindered in its longitudinal movement upon its lower bearing surface by the minimum frictional resistance.

Another special object of the invention is to provide a device in which the retaining frame for the anti-friction roller is entirely mounted upon the exterior of and is supported by the cage or housing, and in which the said frame is so associated with the cage or housing as to prevent the roller from contacting the sides of the frame during normal operation thereof.

Further objects of the invention are to provide a side bearing of the character named which will be light in weight yet sturdy and durable, which will be easy to manufacture and repair, which can be produced at a minimum cost, and which will function efficiently for the purposes intended.

Figure 1:
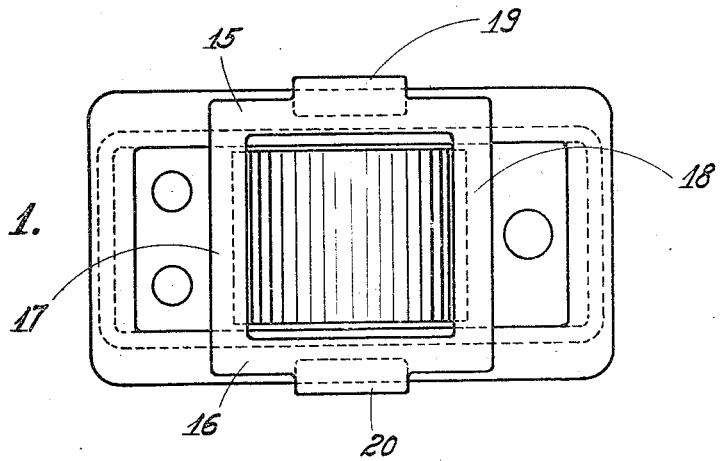
Figure 2:
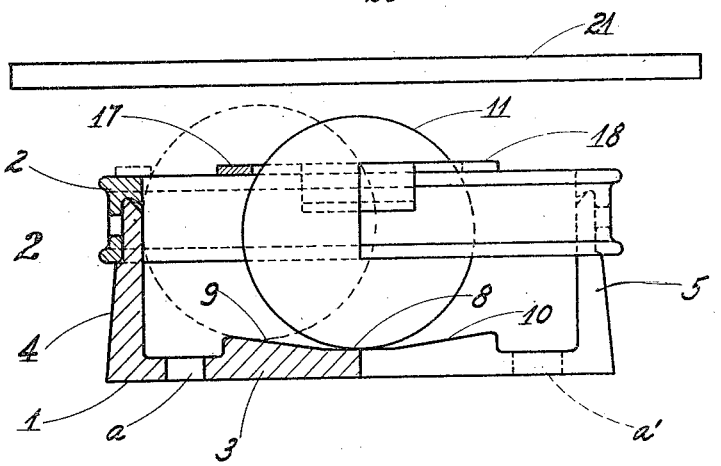
Figure 3:
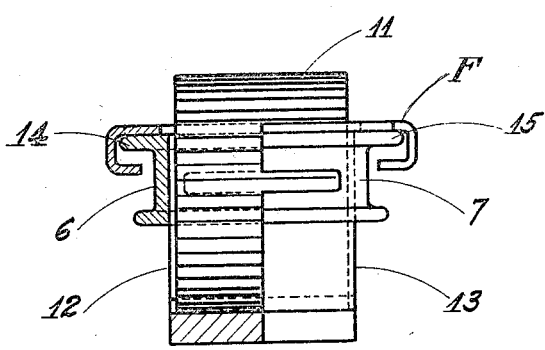

In the accompanying drawings Fig. 1 is a plan view of the preferred embodiment of the invention illustrating the retaining frame in its mid-position; Fig. 2 a side view of the bearing illustrated in Fig. 1, being partly shown in vertical section and partly in side elevation; and Fig. 3 an end view, being partly shown in vertical section and partly in elevation, illustrating the method of mounting the sliding retaining frame upon the cage or housing.

The cage or housing of the bearing is preferably formed of two portions, the lower portion 1 and the upper marginal wall 2, the marginal wall 2 being rectangular in shape and preferably formed of a malleable casting which is shrunk upon the lower portion 1. The housing formed by the assembled upper and lower portions described comprises the bottom 3, the end walls 4, 5 and the side walls 6, 7, the bottom 3 being provided with a lower bearing surface having the flat intermediate portion 8 and the upwardly and outwardly inclined extremities 9, 10. This housing is adapted to be mounted upon the truck bolster by riveting or bolting in the usual manner, apertures for the reception of the bolts or rivets being indicated at $a$ and $a'$.

A cylindrical anti-friction roller 11 whose diameter exceeds the height of the end and side walls of the housing is disposed therein and normally rests freely upon the lower bearing surface, and is rendered self-centering upon the intermediate flat portion 8 by means of the inclined extremities 9, 10.

The housing is open at its sides throughout its entire length below the walls 6 and 7 as indicated at 12 and 13. The upper edges of the side walls 6 are provided with the laterally extending flanges 14 and 15, respectively, upon which the rectangular retaining frame indicated as a whole by the reference character F is mounted for longitudinal sliding movement.

The retaining frame F is rectangular in shape and comprises the longitudinal side bars 15, 16 which are connected by spaced-apart transverse bars or frame members 17, 18. The longitudinal bars 15, 16 are provided midway of their lengths with the lugs or ears 19, 20, respectively, which are bent downwardly and inwardly so as to embrace the respective flanges 14, 15, in the manner illustrated in Fig. 3 of the drawings, for the purpose of fastening the frame to the cage or housing. The distance between the longitudinal side bars 15, 16 is slightly greater than the distance between the side walls 6, 7 of the housing so as to prevent the roller 11 from coming into contact with the side frame members during normal operation of the device. The distance between the transverse bars or frame members 17, 18 is slightly less than the diameter of the roller so as to effectively function to positively retain the roller within the cage or housing and prevent its being lost regardless of the degree of vertical clearance between the roller 11 and the upper bearing plate 21 which is suitably attached to the body bolster in the customary manner.

The operation of the device is as follows: The roller 11 normally rests upon the flat intermediate portion 8 of the lower bearing surface. Whenever the car body sways sufficiently the upper bearing plate 21 is brought into contact with the roller and any swivelling movement of the truck will cause the roller to ride up on the inclined end portions 9 and 10 of the lower bearing surface. As soon as the body lifts, contact between the bearing plate 21 and the roller is broken permitting the roller to gravitate under its own weight back to the flat central portion 8. The return of the roller occurs immediately upon the lifting of the body and without the use of any auxiliary mechanism or parts. This quick return due to the lack of all lost motion devices and the free mounting of the roller is found to be of great practical importance, and in applicant's device is secured by a very simple construction.

Due to the fact that the flat intermediate portion 8 is of appreciable length, the roller 11 will not always come to rest at the same point but at various points throughout its length and will rest upon various parts of its own periphery thus assuring substantially uniform wear of both the bearing plate and the roller. Besides, the roller itself when thrown against the end walls by severe end shocks will rotate somewhat to present new lines of contact.

During the longitudinal movement of the roller 11 upon the lower bearing surface, the same will be prevented from moving laterally an undue extent by means of the side walls 6, 7, and the retaining frame F will ride longitudinally upon the flanges 14, 15, positively retaining the roller in position within the cage or housing and preventing undue vertical displacement or escape of the roller regardless of the degree of vertical clearance between the roller and the upper bearing plate 21. Due to the fact that the distance between the longitudinal side frame members 15, 16 is greater than that between the side walls 6, 7, the roller is kept out of frictional contact with the side frame members during the normal operation of the device.

The bearing described is of simple construction, is economical to manufacture, easy to repair, is very durable and efficient in operation, is quickly responsive and self-centering, contains a minimum number of parts and is so constructed as to prevent accumulation of dirt and foreign substances upon the bearing surfaces.

I claim:

A side bearing for railway cars comprising a cage having a bottom, a pair of side walls and a pair of end walls, the bottom wall being provided with a lower bearing surface, a free roller cooperating therewith, lateral flanges adjacent the upper edges of said side walls, the upper edges of said walls extending above the center of the roller at all times, a retaining frame loosely embracing the roller, said frame being mounted for longitudinal sliding movement upon the upper edges of the side walls and constantly resting upon and supported thereby, the said retaining frame being provided with bent portions projecting therefrom and embracing the said flanges, the distance between the transverse bars of the frame being less than the diameter of the roller and the distance between the longitudinal side bars thereof being greater than that between the side walls of the cage.

In testimony whereof, I sign my name.

ARTHUR B. SEVERN.

Witness:
EDWIN O. JOHNS.